US010629167B2

(12) United States Patent
Lee et al.

(10) Patent No.: US 10,629,167 B2
(45) Date of Patent: Apr. 21, 2020

(54) DISPLAY APPARATUS AND CONTROL METHOD THEREOF

(71) Applicant: SAMSUNG ELECTRONICS CO., LTD., Suwon-si (KR)

(72) Inventors: Dae-bong Lee, Yongin-si (KR); Hyun-sang Choi, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/887,358

(22) Filed: Feb. 2, 2018

(65) Prior Publication Data
US 2018/0247613 A1 Aug. 30, 2018

(30) Foreign Application Priority Data

Feb. 24, 2017 (KR) ........................ 10-2017-0025066

(51) Int. Cl.
G09G 5/377 (2006.01)
G09G 5/02 (2006.01)
G09G 5/14 (2006.01)
G06F 3/14 (2006.01)
G09G 5/10 (2006.01)

(52) U.S. Cl.
CPC ............ G09G 5/377 (2013.01); G06F 3/14 (2013.01); G09G 5/026 (2013.01); G09G 5/14 (2013.01); G09G 5/02 (2013.01); G09G 5/10 (2013.01); G09G 2320/066 (2013.01); G09G 2320/0666 (2013.01); G09G 2340/045 (2013.01); G09G 2340/0442 (2013.01); G09G 2340/10 (2013.01); G09G 2340/12 (2013.01);
(Continued)

(58) Field of Classification Search
None
See application file for complete search history.

(56) References Cited

U.S. PATENT DOCUMENTS 9,355,325 B2  5/2016 Vonolfen et al.
9,699,405 B2 * 7/2017 Wan ...................... H04N 7/144
(Continued)

FOREIGN PATENT DOCUMENTS

JP   2006-333301 A   12/2006
JP       5944904 B2    7/2016
(Continued)

OTHER PUBLICATIONS

International Search Report (PCT/ISA/210) dated May 31, 2018, issued by the International Searching Authority in counterpart International Application No. PCT/KR2018/001009.
(Continued)

Primary Examiner — Jwalant Amin
(74) Attorney, Agent, or Firm — Sughrue Mion, PLLC

(57) ABSTRACT

A display apparatus and a control method thereof are provided. The display apparatus may include a memory configured to store data related to a background image of an area behind the display apparatus, a display configured to display content by overlaying the content onto the background image, a sensor configured to generate sensing data related to external light that is ambient to the display apparatus, and a processor configured to perform image-processing of at least one of the background image and the content, based on a type of the content and the sensing data.

17 Claims, 15 Drawing Sheets

(52) U.S. Cl.
CPC ... *G09G 2340/14* (2013.01); *G09G 2360/144* (2013.01); *G09G 2380/16* (2013.01)

(56) References Cited

U.S. PATENT DOCUMENTS

| | | |
|---|---|---|
| 2009/0046106 A1 | 2/2009 | Park et al. |
| 2010/0066762 A1 | 3/2010 | Yeh et al. |
| 2010/0201709 A1 | 8/2010 | Yang et al. |
| 2011/0193867 A1 | 8/2011 | Ahn et al. |
| 2012/0033937 A1 | 2/2012 | Kim et al. |
| 2013/0257848 A1 | 10/2013 | Westerinen et al. |
| 2014/0055481 A1* | 2/2014 | Gao ................ G09G 5/02 345/589 |
| 2014/0098289 A1 | 4/2014 | Jang et al. |
| 2014/0285477 A1 | 9/2014 | Cho et al. |
| 2016/0035138 A1* | 2/2016 | Kim ............... H04N 5/265 345/633 |
| 2016/0343116 A1 | 11/2016 | Park et al. |
| 2017/0083999 A1* | 3/2017 | Saurabh .............. G06T 1/60 |
| 2018/0025521 A1* | 1/2018 | Allen ............... G06T 11/001 345/589 |

FOREIGN PATENT DOCUMENTS

| | | |
|---|---|---|
| KR | 10-0557618 B1 | 3/2006 |
| KR | 10-2006-0106046 A | 10/2006 |
| KR | 10-2012-0055990 A | 6/2012 |
| KR | 10-1172268 B1 | 8/2012 |
| KR | 10-1184876 B1 | 9/2012 |
| KR | 10-2016-0137258 A | 11/2016 |
| WO | 2010/120137 A2 | 10/2010 |
| WO | 2017/007263 A1 | 1/2017 |

OTHER PUBLICATIONS

Written Opinion (PCT/ISA/237) dated May 31, 2018, issued by the International Searching Authority in counterpart International Application No. PCT/KR2018/001009.

Communication dated Aug. 2, 2019, issued by the European Patent Office in counterpart European Application No. 18757591.5.

Communication dated Oct. 30, 2019, issued by the European Patent Office in counterpart European Application No. 18757591.5.

* cited by examiner

DISPLAY APPARATUS AND CONTROL METHOD THEREOF

CROSS-REFERENCE TO RELATED APPLICATION

This application claims priority from Korean Patent Application No. 10-2017-0025066, filed in the Korean Intellectual Property Office on Feb. 24, 2017, the disclosure of which is incorporated by reference herein in its entirety.

BACKGROUND

1. Field

Apparatuses and methods consistent with the present disclosure relate to a display apparatus and a control method thereof, and more particularly, to a display apparatus which displays content by overlaying the content onto a background image on the background of a display apparatus and a control method thereof.

2. Description of Related Art

With the development of electronic technology, various types of electronic apparatuses have been developed and distributed. To provide an aesthetic function, a display apparatus has been developed which displays a background image that is the same as the wall behind the display apparatus and thus provides a user with a visual effect as if the display apparatus were a window.

SUMMARY

One or more example embodiments provide a display apparatus which maximizes a transparent effect of a display provided in the display apparatus and a control method thereof.

According to an aspect of an example embodiment, there is provided a display apparatus including a memory configured to store data related to a background image of an area behind the display apparatus; a display configured to display content by overlaying the content onto the background image; a sensor configured to generate sensing data related to external light ambient to the display apparatus; and a processor configured to perform image-processing of at least one of the background image and the content, based on a type of the content and the sensing data.

The processor may be further configured to perform image-processing of the background image based on the sensing data, and determine whether to perform image-processing of the content based on the type of the content.

The processor may be further configured to perform image-processing of the background image based on the sensing data, and determine whether to perform image-processing of the content based on the image-processed background image and the type of the content.

The processor may be further configured to perform image-processing of the background image based on the sensing data, and perform image-processing of the content based on the image-processed background image and the type of the content.

The sensor may be further configured to generate the sensing data related to at least one of a brightness and a color temperature of the external light, and the processor may change a contrast of at least one of the background image and the content based on the brightness, and change a white balance of at least one of the background image and the content based on the color temperature.

The processor may be further configured to, if at least one of the brightness and the color temperature changes by a threshold value or more, perform the image-processing for a period of time.

The display apparatus may further comprise a video processor configured to recover encoded data by decoding the data, wherein the processor comprises a graphic processor configured to perform graphic-processing of input data, and wherein the processor allocates the background image and the content to the graphic processor and the video processor, and the graphic processor and the video processor perform image-processing of the allocated background image and the allocated content.

The processor may be further configured to allocate the content to one of the graphic processor and the video processor based on the type of the content, and allocate the background image to the other one of the graphic processor and the video processor.

The processor may be further configured to, if a first resolution rate of the content is different from a second resolution rate of the display, control the display to display the background image on a portion of an area on which the content is displayed.

According to an aspect of another example embodiment, there is provided a control method of a display apparatus, the control method comprising storing data related to a background image of an area behind the display apparatus; displaying content by overlapping the content onto the background image; generating sensing data related to external light that is ambient to the display apparatus; and performing image-processing of at least one of the background image and the content, based on a type of the content and the sensing data.

The performing image-processing may comprise performing image-processing of the background image based on the sensing data, and determining whether to perform image-processing of the content based on the type of the content.

The performing image-processing may comprise performing image-processing of the background image based on the sensing data, and determining whether to perform image-processing of the content based on the image-processed background image and the type of the content.

The performing image-processing may comprise performing image-processing of the background image based on the sensing data, and performing image-processing of the content based on the image-processed background image and the type of the content.

The generating sensing data may comprise generating the sensing data related to at least one of a brightness and a color temperature of the external light, and the performing image-processing may comprise changing a contrast of at least one of the background image and the content based on the brightness, and changing a white balance of at least one of the background image and the content based on the color temperature.

The performing image-processing may comprise, if at least one of the brightness and the color temperature changes by equal to or more than a threshold value, performing the image-processing for a period of time.

The display apparatus may comprise a graphic processor configured to perform graphic-processing of input data and a video processor configured to recover encoded data by decoding the data, and the performing image-processing may comprise allocating the background image and the content to the graphic processor and the video processor, and performing, by the graphic processor and the video processor, image-processing of the allocated background image and the allocated content.

The performing image-processing may comprise allocating the content to one of the graphic processor and the video processor based on a type of the content and allocating the background image to the other one of the graphic processor and the video processor.

The displaying content may comprise, if a first resolution rate of the content is different from a second resolution rate of the display, displaying the background image on a portion of an area on which the content is displayed.

According to an aspect of another example embodiment, there is provided a non-transitory recording medium in which a program for performing an operation method of a display apparatus is stored, the operation method comprising storing data related to a background image of an area behind the display apparatus; displaying content by overlapping the content onto the background image; generating sensing data related to external light that is ambient to the display apparatus; and performing image-processing of at least one of the background image and the content, based on a type of the content and the sensing data.

BRIEF DESCRIPTION OF THE DRAWINGS

The above and/or other aspects will become apparent and more readily appreciated from the following description of example embodiments, taken in conjunction with the accompanying drawings of which.

DETAILED DESCRIPTION

Figure 1A:
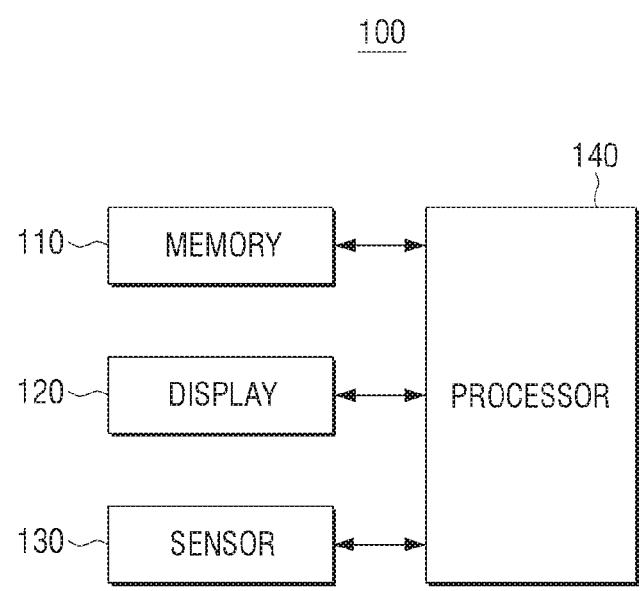
FIG. 1A is a diagram illustrating a display apparatus according to an example embodiment.

The example embodiments of the present disclosure may be diversely modified. Accordingly, specific exemplary embodiments are illustrated in the drawings and are described in detail in the detailed description. However, it is to be understood that the present disclosure is not limited to a specific example embodiment, but includes all modifications, equivalents, and substitutions without departing from the scope and spirit of the present disclosure. Also, well-known functions or constructions are not described in detail since they would obscure the disclosure with unnecessary detail. Herein, expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

In general, a display apparatus which displays a background image that is the same as the wall behind the display apparatus measures a brightness using a single illumination sensor and performs image-processing of the background image based on the brightness. However, the image-processed background is displayed differently from the wall behind the display apparatus because a color temperature, etc. is not reflected in the image.

Accordingly, there has emerged the need for maximizing the transparent effect by taking into account not only a brightness depending on the surrounding lighting but also a color temperature, etc. in image-processing of the background image. In other words, it is more advantageous for the background image to be seen more transparently and for the content which is overlaid onto the background image to be displayed conforming to the purpose of the content.

Hereinafter, various example embodiments will be described in greater detail with reference to the accompanying drawings.

FIG. 1A is a diagram illustrating a display apparatus 100 in accordance with an example embodiment. According to FIG. 1A, the display apparatus 100 may include a memory 110, a display 120, a sensor 130 and a processor 140.

According to one or more example embodiments, the display apparatus 100 may include one or more display(s), and the display apparatus 100 may be configured to execute an application and/or to display content, and may be implemented as a digital television, a tablet, a personal computer (PC), a portable multimedia player (PMP), a personal digital assistant (PDA), a smart phone, a cell phone, a digital picture frame, a digital signage, a kiosk, or the like.

The memory 110 may store data related to a background image of, for example, a wall behind the display apparatus 100. The background image behind the display apparatus 100 may be obtained by photographing the area behind the display apparatus 100 by a separate camera.

The memory 110 may store not only a background image but also content, etc. The memory may also store an image-processing method related to content and a background image. The memory 110 may refer to a storage medium in general, and may be implemented as a random access memory (RAM) or any storage medium which can store data, such as a hard disk drive (HDD), a solid-state disk drive (SDD), etc.

The display 120 may display content by overlaying the content onto the background image. For example, the display 120 may overlay a certain image onto the background image.

The display 120 may be implemented as a liquid crystal display panel (LCD), an organic light emitting diodes (OLED), etc., but is not limited thereto. In some cases, the display 120 may be implemented as a flexible display, etc.

The sensor 130 may generate sensing data related to external light (e.g., an ambient light to the display apparatus 100). The sensor 130 may sense external light, and output the sensing result as sensing data. For example, the sensor 130 may be arranged on the front surface of the display apparatus 100, and may sense external light incident to the front surface of the display apparatus 100 and output the sensing result as sensing data.

The sensor 130 may generate sensing data by sensing at least one of a brightness and a color temperature of external light, but the example embodiments are not limited thereto. The sensor 130 may sense various data related to external light. For example, the sensor 130 may sense an incident direction, etc. of external light. In this case, the sensor 130 may include a plurality of sensors 130 arranged on the display apparatus 100, for example, on each side of the display apparatus 100, and the incident direction of light may be determined based on the side on which the strength of incident light sensed by each sensor 130 is highest.

The sensor 130 may be a separate optical sensor, a one-dimensional optical sensor, a two-dimensional optical sensor, or a complex optical sensor, etc. The sensor 130 may be manufactured using semi-conductive material, and the semi-conductive material may be selected with reference to the range of wave to be used.

The sensor 130 may sense natural light, but the example embodiments are not limited thereto. For example, the sensor 130 may emit artificial light and sense the light reflected. Also, the sensor 130 may photograph an image such as a camera. In this case, the processor 140 may identify the strength, the incident direction, etc. of light based on the photographed image.

The processor 140 may control overall operations of the display apparatus 100. The processor 140 may be one or more hardware processors, such as microprocessors, central processing units (CPUs), or graphics processing units (GPUs).

The processor 140 may perform image-processing of at least one of a background image and content based on a type of content and sensing data. For example, the processor 140 may perform image-processing of the background image based on the sensing data from the sensor 130, and perform image-processing of content based on a type of content and the image-processed background image.

The processor 140 may perform image-processing of the background image based on the sensing data from the sensor 130, and determine whether to perform image-processing of the content based on a type of the content. The processor 140 may also perform image-processing of the background image based on the sensing data from the sensor 130, and determine whether to perform image-processing of the content based on the image-processed background image and a type of the content.

For example, if a type of content is a frame, the processor 140 may perform image-processing of the content, and if a type of content is a clock, a video, a photo, etc., the processor 140 may omit performing image-processing of the content.

Even if a type of content is a clock, the processor 140 may perform image-processing of the content based on the image-processed background image. For example, if the difference between the average brightness of the content and the average brightness of the image-processed background image is within a threshold difference, the processor 140 may perform image-processing of the content even if the content is a clock. The threshold may be predetermined, and may be set experimentally or by a user, etc.

In other words, the processor 140 may determine whether to perform image-processing of content based on a visibility of the content. In this case, the memory 110 may store the information about a type of content which requires a high visibility, and the processor 140 may determine whether to perform image-processing of the content based on the information stored in the memory 110.

The processor 140 may process the background image such that the processed background image looks the same as, for example, a wall behind the display apparatus 100. In other words, the processor 140 may provide the visual effect as if the area on which the background image is displayed is a glass window in a wall behind the display apparatus 100. Accordingly, a user may feel as if the display apparatus 100 is a transparent window. In the below description, the above-described visual effect may be referred to as a transparent effect for ease of description.

The background image may be obtained by photographing an area behind the display apparatus 100. However, there is a technical problem in that the external light at a first time when the background of the display apparatus is photographed may be different from the external light at a second time when the background image is displayed. That is, the first time may be different than the second time. The processor 140 may perform image-processing of the background image based on the sensing data related to the external light at the second time when the background image is displayed, and provide the visual effect as if the area on which the background image is displayed is a window. Examples of this will be shown later with reference to the drawings.

The sensor 130 may generate the sensing data by sensing at least one of a brightness and a color temperature of the external light, and the processor 140 may change a contrast of at least one of the background image and the content based on the brightness, and change a white balance of at least one of the background image and the content based on the color temperature.

If at least one of the brightness and the color temperature changes by a threshold value or more, the processor 140 may perform the image-processing in sequence for a threshold period of time, and after the period of time elapses stop performing the image-processing. The threshold value may be predetermined, and may be set experimentally or by a user, etc. For example, if the brightness changes by a threshold value or more as the light around the display apparatus is turned on, the processor 140 may perform image-processing in sequence for 5 minutes which is a threshold period of time. The threshold period of time may be predetermined, and may be set experimentally or by a user, etc.

If a resolution rate of the content is different from a resolution rate of the display, the processor 140 may display the background image on an external area of the area on which the content is displayed.

The display apparatus may further include a video processor which recovers encoded data by decoding the data, and the processor 140 may include a graphic processor configured to perform graphic-processing of input data, and the processor 140 may allocate the background image and the content to the graphic processor and the video processor, respectively, and perform image-processing of the background image and the content. The graphic processor may be configured to generate graphic data based on the input data, such as an on-screen display (OSD), and the video processor may be configured to recover encoded data by decoding the data.

However, the example embodiments are not limited to the above example. The video processor may perform graphic-processing of input data as the graphic processor does. The graphic processor and the video processor will be described in greater detail later.

The processor 140 may allocate the background image and the content to the graphic processor and the video processor, respectively, and perform image-processing of the background image and the content. For example, the processor 140 may allocate the content to one between the graphic processor and the video processor based on a type of the content, and allocate the background image to the other one between the graphic processor and the video processor.

For example, if the content is an encoded video, the processor 140 may allocate the content to the video processor, and allocate the background image to the graphic processor.

Figure 1B:
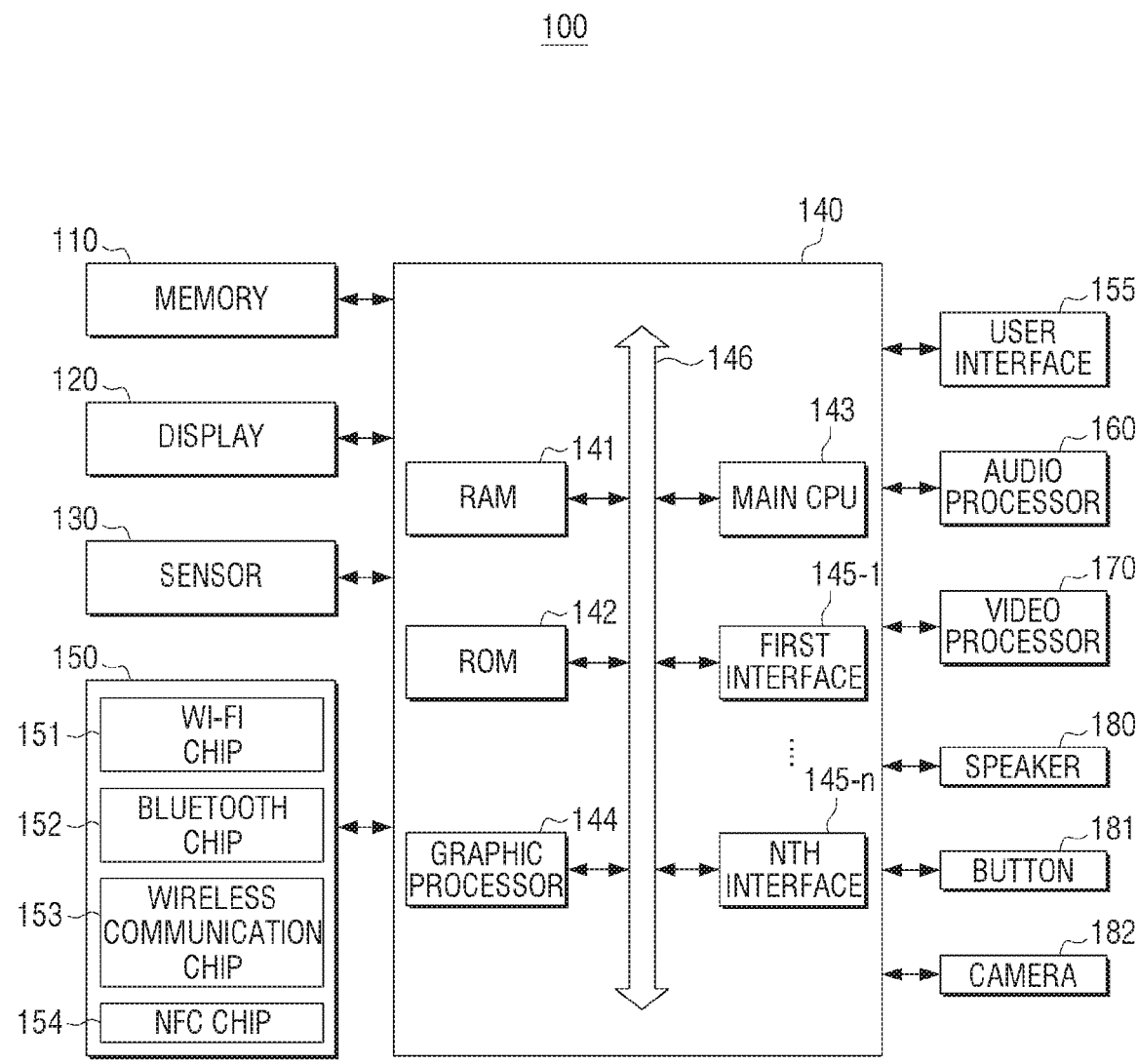
FIG. 1B is a block diagram illustrating an example configuration of a display apparatus of FIG. 1A, according to an example embodiment.

FIG. 1B is a block diagram illustrating an example embodiment of a specific configuration of a display apparatus 100 of FIG. 1A. According to FIG. 1B, the display apparatus 100 may include the memory 110, the display 120, the sensor 130, the processor 140, a communicator 150, a user interface 155, an audio processor 160, a video processor 170, a speaker 180, a button 181, and a camera 182. The detailed description of the elements illustrated in FIG. 1B which are overlapped with the elements in FIG. 1A will not be repeated for conciseness.

The processor 140 may control overall operations of the display apparatus 100 using various programs stored in the memory 110.

For example, the processor 140 may include a random access memory (RAM) 141, a read only memory (ROM) 142, a main CPU 143, a graphic processor 144, a first to nth interfaces 145-1~145-n and a bus 146.

The RAM 141, the ROM 142, the main central processing unit (CPU) 143, the graphic processor 144, the first to nth interfaces 145-1~145-n may be connected to one another via the bus 146.

The first to nth interfaces 145-1~145-n may be connected with the various elements described above. One of the interfaces may be a network interface which is connected with an external apparatus via network.

The main CPU 143 may access to the memory 110 and perform booting using an O/S stored in the memory 110. The main CPU 143 may also perform various operations using a variety of programs stored in the memory 110.

In the ROM 142, a command word set, etc. for booting a system of the display apparatus 100 may be stored. Once a turn-on command is input and power is supplied, the main CPU 143 may copy the operating system (O/S) stored in the memory 110 to the RAM 141 in response to a command word stored in the ROM 142, and boot the system by executing the O/S. Once the booting is completed, the main CPU 143 may copy various application programs stored in the memory 110 to the RAM 141, and perform various operations by executing the application program copied to the RAM 141.

The graphic processor 144 may generate a screen which includes various objects such as an icon, an image, text, etc. using a calculation unit (not illustrated) and a rendering unit (not illustrated). The calculation unit may calculate an attribute value such as a coordinate value, a shape, a size, a color, etc. with which each object is displayed conforming to the layout of the screen based on a received control command. The rendering unit may generate a screen of a variety of layouts which includes an object based on the attribute value calculated by the calculation unit. The screen generated in the rendering unit (not illustrated) may be displayed on a display area of the display 120.

The operation of the processor 140 described above may be performed by a program stored in the memory 110.

The memory 110 may store various data for operating the display apparatus 100, such as an operating system (O/S) software module, an image-processing module, and a sensing data processing module, etc.

The processor 140 may process an input image based on the information stored in the memory 110 and display the processed image.

The communicator 150 may communicate with various types of external apparatuses by a variety of communication methods. The communicator 150 may include a Wi-Fi chip 151, a Bluetooth chip 152, a wireless communication chip 153, a near field communication (NFC) chip 154, etc. The processor 130 may communicate with various external apparatuses using the communicator 150.

The Wi-Fi chip 151 and the Bluetooth chip 152 may perform communication by Wi-Fi and Bluetooth, respectively. In the case of using the Wi-Fi chip 151 or the Bluetooth chip 152, connection information such as an SSID and a session key, etc. may be transmitted and received, communication may be performed using the information and various information may be transmitted and received. The wireless communication chip 153 may refer to a chip that performs communication in accordance with various communication standards, such as IEEE, Zigbee, 3rd generation (3G), 3rd generation partnership project (3GPP), long term evolution (LTE), etc. The NFC chip 154 may refer to a chip that operates in a near field communication (NFC) method which uses, for example, a 13.56 MHz-band from among various RF-ID frequency bands, such as 135 kHz, 13.56 MHz, 433 MHz, 860 to 960 MHz, and 2.45 GHz.

The communicator 150 may perform unidirectional communication or bidirectional communication with an external apparatus. If the communicator 150 performs unidirectional communication, the communicator 150 may receive a signal from an external apparatus. If the communicator 150 performs bidirectional communication, the communicator 150 may receive a signal from an external apparatus, and/or transmit a signal to an external apparatus.

The user interface 155 may receive various user interactions. The user interface 155 may be implemented in various forms depending on an example embodiment of the display apparatus 100. If the display apparatus 100 is implemented as a digital TV, the user interface 155 may be implemented as a signal receiver which receives a remote control signal from a remote control device or a keyboard, a camera which detects a motion of a user, a microphone which receives a user voice, etc. Also, if the display apparatus 100 is implemented as a touch-based electronic apparatus, the user interface 155 may be implemented as a touch screen forming an inter-layer structure with a touch pad. In this case, the user interface 155 may be used as the display 120 described above.

The audio processor 160 may perform processing of audio data. The audio processor 160 may perform various processing operations such as decoding, amplifying, noise-filtering, etc.

The video processor 170 may perform processing of video data. The video processor 170 may perform various image-processing operations such as decoding, scaling, noise-filtering, a frame rate conversion, a resolution conversion, etc.

The speaker 180 may output not only various audio data processed in the audio processor 160 but also various alarm sounds or a voice message, etc.

The button 181 include one or more buttons and may be various forms of buttons such as a mechanical button, a touch pad, a wheel, etc. which are formed on an area such as, for example, the front surface, the side surface, or the back surface, etc. of the exterior of the main body of the display apparatus 100.

The camera 182 may photograph a still image or a video in accordance with a user control. The camera 182 may be implemented as a plurality of cameras such as, for example, a front camera and a rear camera. However, this is only an example, and cameras may be provided in various locations on the display apparatus 100.

As described above, the processor 140 may perform image-processing of at least one of a background image and content based on sensing data from the sensor 130, thereby maximizing the transparent effect of the display 120 and improving a user visibility.

Below, the operations of the display apparatus 100 will be described in greater detail with reference to the drawings.

Figure 2:
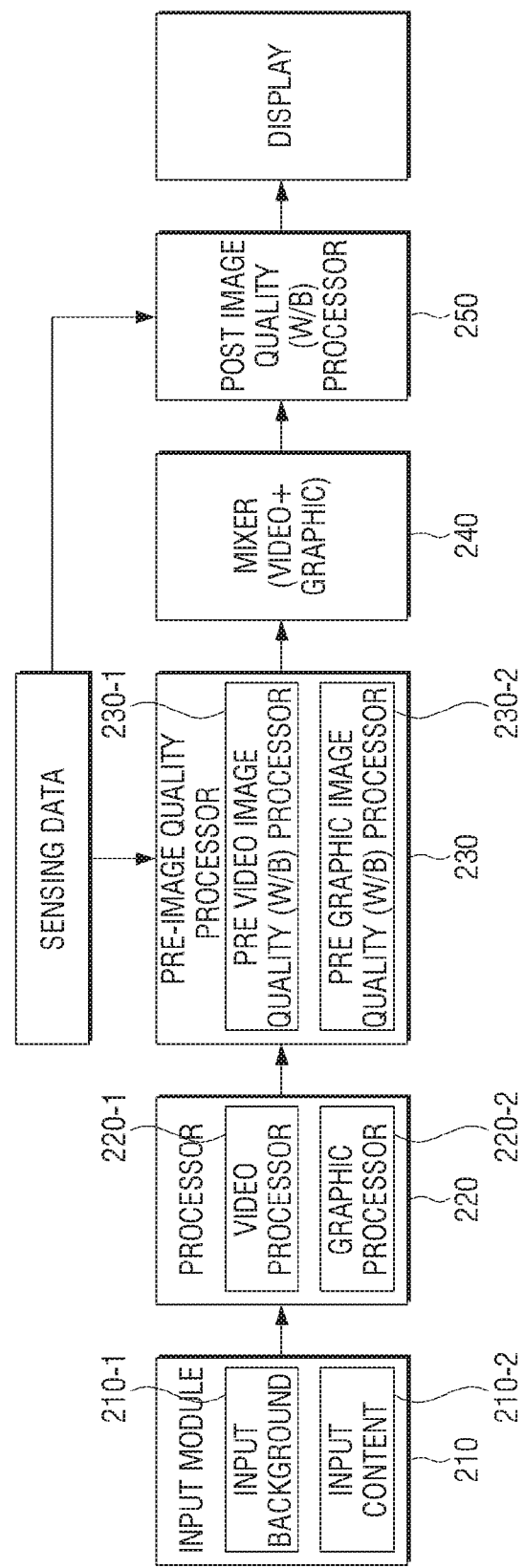
FIG. 2 is a diagram illustrating operations of a display apparatus according to an example embodiment.

FIG. 2 is a diagram illustrating operations of a display apparatus 100 in accordance with an example embodiment. In some example embodiments, the operations of the display apparatus 100 may be performed in sequence from left to right as shown in FIG. 2. The operations of FIG. 2 may be performed by the processor 140 of the display apparatus 100.

The input module 210 may receive background data (input background 210-1) and content data (input content 210-2). The input module 210 may transmit the background data and the content data to the video processor and the graphic processor of the processor 220 depending on a type of the content data.

For example, if the content data such as a clock, weather information, etc. is drawn in a graphic format, the input module 210 may transmit the content data to the graphic processor, and transmit the background data to the video processor. If the content data such as, for example, a video, a photo, etc., is output in a form of video, the input module 210 may transmit the content data to the video processor and transmit the background data to the graphic processor. That is, the input module 210 sends the data to an appropriate one of the video processor and the graphics processor for handling the data, based on the type/format of the data.

However, the example embodiments are not limited to the above example. The background data and the content data input in the input module 210 may be stored in the memory 110. The background data and the content data stored in the memory 110 may be transmitted to the video processor 220-1 and the graphic processor 220-2 of the processor 220 depending on a type of the content data.

The processor 220 may process the input background data and content data. The video processor 220-1 may recover an image from the data input through a decoder and a scaler. The video processor 220-1 may transmit the recovered image to a pre-video image quality white balance (W/B) processor 230-1 of the pre-image quality processor 230.

The graphic processor 220-2 may mix the graphics drawn on a plurality of windows based on the input data and generate an image. The graphic processor 220-2 may transmit the generated image to a pre-graphic image quality white balance (W/B) processor 230-2 of the pre-image quality processor 230.

The pre-image quality processor 230 may include the pre-video image quality (W/B) processor 230-1 and the pre-graphic image quality (W/B) processor 230-2. The pre-image quality processor 230 may perform image-processing of an image received from the processor 220.

The pre-video image quality processor 230-1 may perform image-processing (e.g., W/B and dimming) of the recovered image received from the video processor 220-1 based on the sensing data 235 from the sensor 130. The pre-graphic image quality processor 230-2 may perform image processing of the generated image received from the graphic processor 230-2 based on the sensing data 235 from the sensor 130. Thus, the pre-video image quality processor 230-1 and the pre-graphic image quality processor 230-2 may perform image processing in parallel.

The sensing data 235 may be a sensor value sensed by the sensor 130, such as a brightness (lux) value, a color temperature value, etc. The sensor may include a plurality of illumination sensors, an image sensor, a color sensor, etc. The sensor may sense one or more values of at least one of a direction, a strength, an illumination, and a color temperature of light.

The processor 140 acting as a sensor controller may calculate a brightness and a color temperature which the display apparatus 100 is able to use based on the value (a brightness value, a color temperature value, an illumination value, etc.) obtained by sensing by the sensor 130. In other words, the processor 140 acting as a sensor controller may sense the changes in lights and a surrounding (ambient) environment and calculate a brightness and a color temperature in real time, and provide the real-time brightness and/or the real-time color temperature as sensing data to the pre-image quality processor 230 and a post image quality (W/B) processor 250.

The pre-image quality processor 230 may change a white balance (W/B) of the background data and/or the content data and set the white balance to be consistent with the white balance of the surrounding (ambient) environment. For example, the pre-image quality processor 230 may change the color temperature of the background data and/or the content data to between Warm (about 6500K) and Cool (about 2700K).

The pre-image quality processor 230 may set a final color temperature as a target, set a white balance register value as a predetermined step, and control the speed of a color temperature change through the step change.

The mixer 240 may mix a video and a graphic. The mixer 240 may mix a plurality of pieces of data into one piece of data.

The post image quality (W/B) processor 250 may perform image-processing on the mixed data considering a hardware characteristic. In some example embodiments, if the pre-image quality processor 230 performs image-processing, the post image quality processor 250 may omit any separate image-processing.

The display 120 may display the final, image-processed background image and content.

Figure 3:
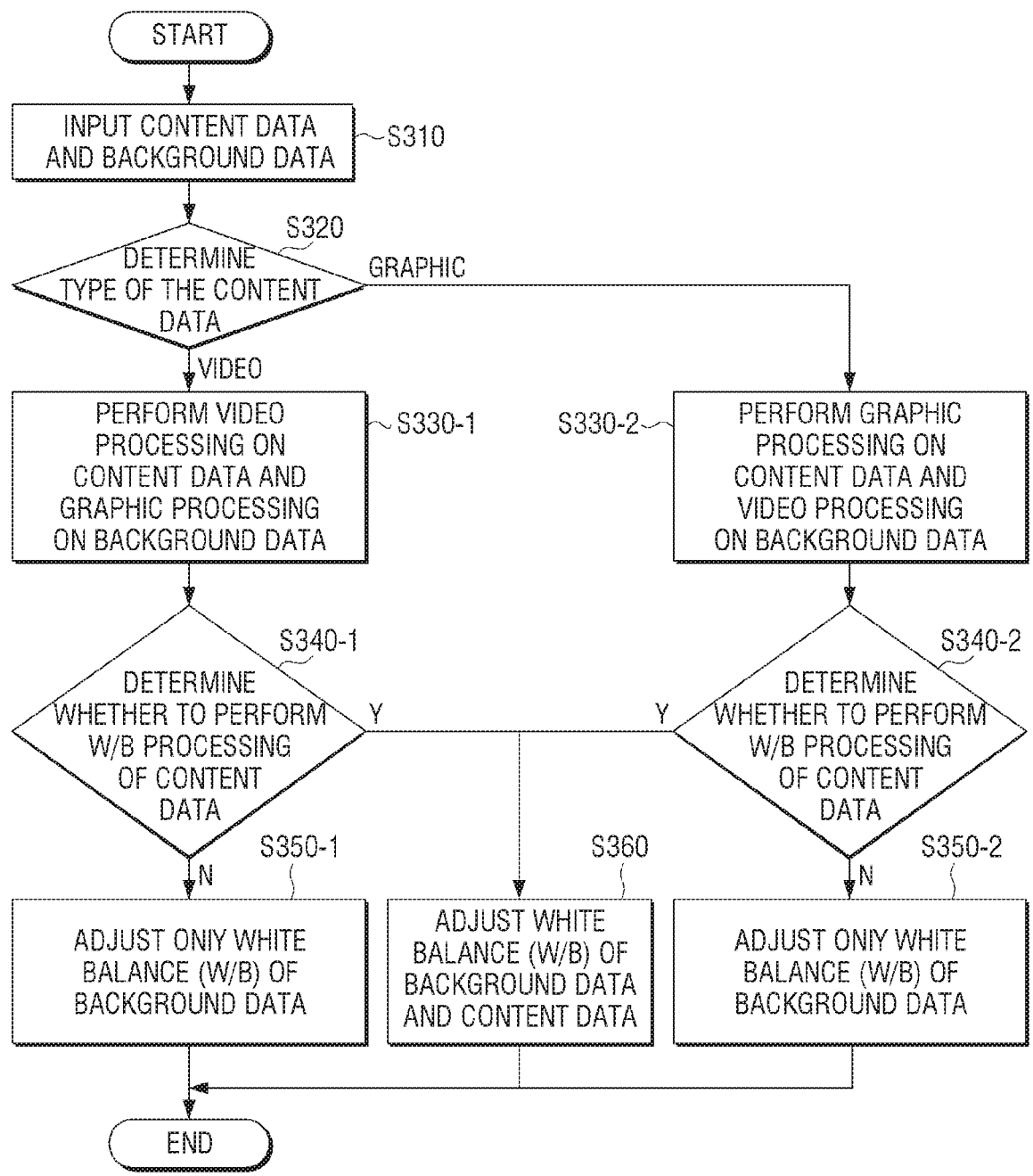
FIG. 3 is a diagram illustrating an operation of a display apparatus depending on a type of content data, according to an example embodiment.

FIG. 3 is a diagram illustrating an operation depending on a type of content data in accordance with an example embodiment.

The content data and the background data may be input (S310), and a type of the content data may be determined (S320). If a type of the content data is of the content which cannot be processed by a graphic processor, that is, if the content data is, for example, a video, the content data may be processed as a video (i.e., video processing is performed), and the background data may be processed as a graphic (i.e., graphic processing is performed) (S330-1).

If it is difficult to process the content data as a video, that is, if the content data is weather information for example, the content data may be processed as a graphic (i.e., graphic processing is performed), and the background data may be processed as a video (i.e., video processing is performed) (S330-2).

If the content data and the background data are processed as video and graphic, respectively, content and a background image may be generated.

In the case in which the content data is processed as a video and the background data is processed as a graphic, it is determined whether to perform white balance (W/B) processing of the content data (S340-1). If it is determined not to process a white balance of the content (S3401-1, N), only the white balance of the background data may be adjusted (S350-1).

On the other hand, in the case in which the content data is processed as a graphic and the background data is processed as a video, it is determined whether to perform white balance (W/B) processing of the content data (S340-2). If it is determined not to process a white balance of the content (S340-2, N), only the white balance of the background data may be adjusted (S350-2).

If it is determined in operation S340-1 or S340-2 that the white balance of the content is processed (S340-1 or S340-2, Y), the white balance of the content data and the background data may be adjusted (S360).

As described above, if the white balance of the background data is adjusted, the area on which the background data is displayed may look the same as an area behind the display apparatus 100 (e.g., a wall), and accordingly, the visual effect as if the displayed area is a glass window may be provided.

Further, since the content data and the background data are processed separately, the processing speed may improve.

In other example embodiments, the content data may include information of whether to perform image-processing of the content data, and the processor 140 may determine whether to perform image-processing based on the information included in the content data. For example, if the information that the image-processing of the content data is required is included in the content data, the processor 140 may perform image-processing of the content data regardless of a type of the content data.

If the information that the image-processing of the content data is required is not included in the content data, the processor 140 may determine whether to perform image-processing of the content data based on a type of the content data.

FIGS. 2 and 3 illustrate the example in which there is provided one video processor and one graphic processor, but the example embodiments are not limited thereto. For example, the display apparatus 100 may include a plurality of video processors. Alternatively or additionally, the display apparatus 100 may include a plurality of graphic processors. Also, the video processor may process a plurality of pieces of data simultaneously.

Figure 4A:
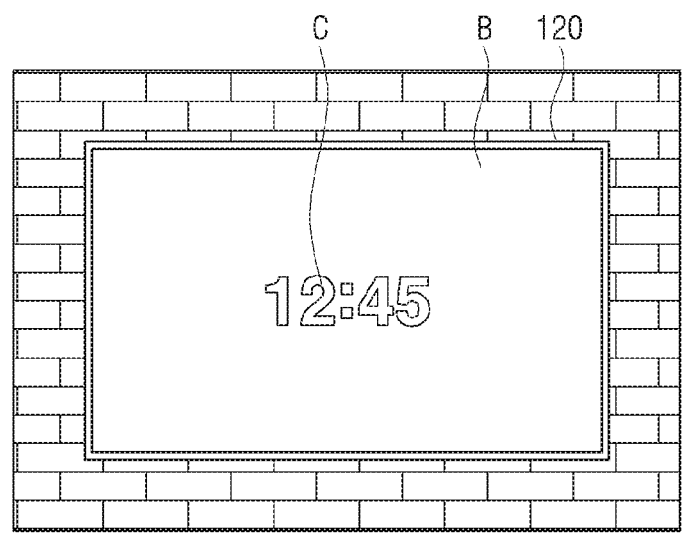
FIGS. 4A, 4B and 4C are diagrams illustrating an operation depending on content which requires a high visibility, according to an example embodiment.
Figure 4B:
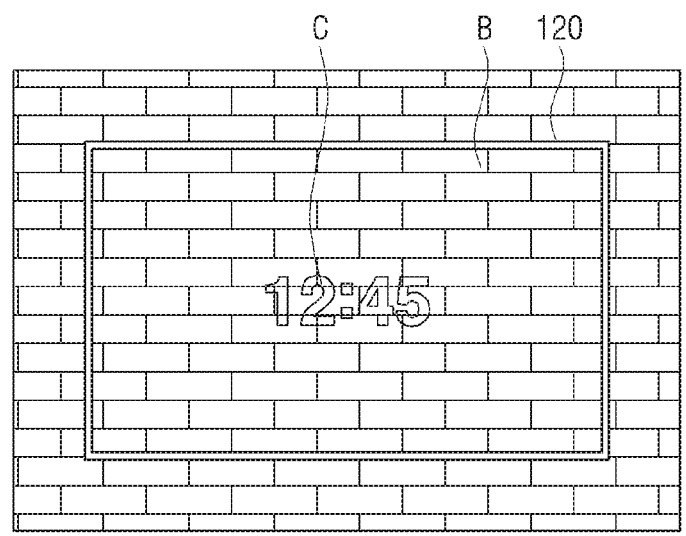
Figure 4C:
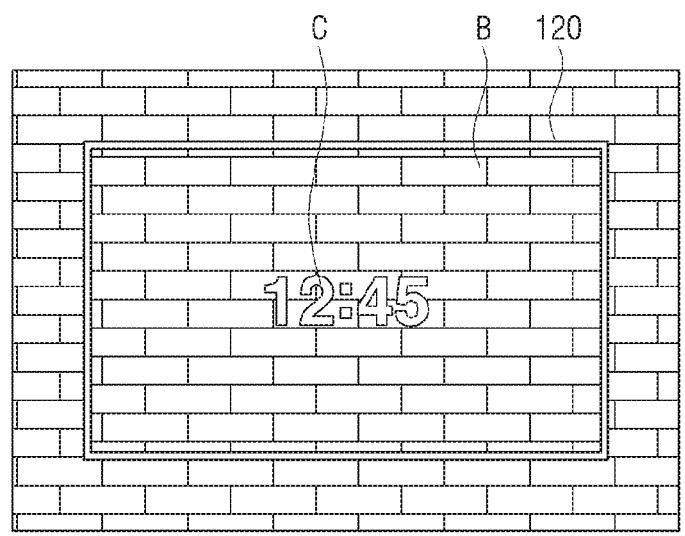

FIGS. 4A, 4B and 4C are diagrams illustrating an operation performed depending on content which requires a high visibility, in accordance with an example embodiment. In other words, FIGS. 4A, 4B and 4C are diagrams illustrating the example of displaying the content which requires a high visibility, such as a clock, etc. The term "visibility" may refer to the characteristic that the presence or the shape of an object should be easily identifiable by a viewer, and the content for providing information to a user may be classified as the content which requires a high visibility. In FIGS. 4A-4C, a display 120 is provided on, for example, a brick wall. However, this is only an example.

FIG. 4A is a diagram illustrating an example in which a background image B and content C before image-processing are displayed. In this case, since the image-processing of the background image is not performed, a transparent effect is not generated. Thus, a user may not experience a transparent effect.

FIG. 4B is a diagram illustrating an example in which the image-processed background image and the image-processed content are displayed after the image-processing of the background image and of the content are performed. In this case, since the image-processing of the background image is performed, a transparent effect is generated. Thus, a user may experience the transparent effect.

However, since the image-processing of the content is also performed, it may be difficult to distinguish the content from the background image. In other words, if the image-processing of the content is performed together with the image-processing of the background image, it may be difficult to achieve a high visibility.

FIG. 4C is a diagram illustrating an example in which after only the image-processing of the background is performed, the image-processed background image and the content to which image-processing is not performed are displayed. In this case, since only the image-processing of the background image is performed, a transparent effect may be generated. Thus, a user may experience the transparent effect, and a high visibility of the content may be achieved. Thus, if high visibility of content is an important factor, the processor 140 may perform only the image-processing of the background image, and the content may be displayed without image-processing of the content.

FIGS. 4A, 4B and 4C illustrate the example of the content such as a clock, but the example embodiments are not limited thereto. For example, the content may be implemented as any object which can be attached on or displayed on a wall, such as a memo, etc.

FIGS. 4A, 4B and 4C illustrate that whether to perform image-processing of content may be determined based on a visibility consideration, but the example embodiments are not limited thereto. For example, the processor 140 may compare the content and the background image and determine whether to perform image-processing of the content. As an example, the processor 140 may compare the color of the content and the color of the background image and determine whether to perform image-processing of the content.

If the color of the background image is dark, and the color of the content is bright, the processor 140 may perform the image-processing of the background image together with the image-processing of the content. In this case, as the contrast is high, even if the image-processing is performed, the visibility of the content data may be achieved.

If the color of the background image and the content are all dark, the processor 140 may omit performing the image-processing of the content. If only the image-processing of the background image is performed, the visibility of the content may be further improved than in a case in which the image-processing of the content is performed.

Also, the processor 140 may determine whether to perform image-processing of content based on at least one of a brightness, a contrast, and a chroma as well as a color of the content.

Figure 5A:
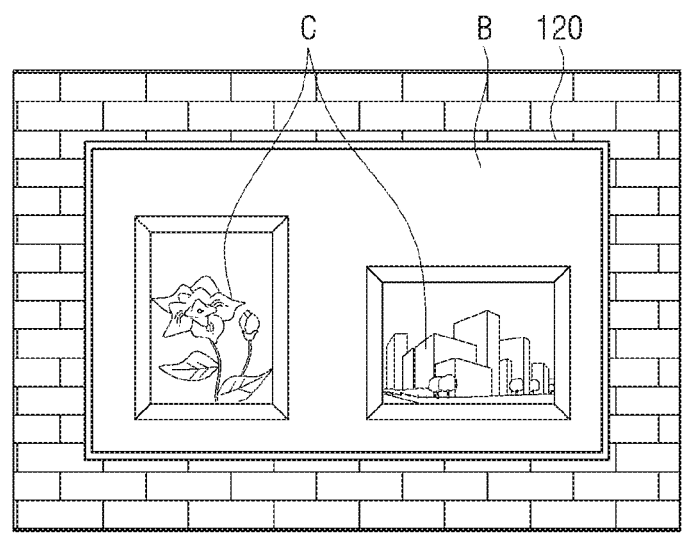
FIGS. 5A, 5B and 5C are diagrams illustrating an operation depending on content which requires a naturalness, according to an example embodiment.
Figure 5B:
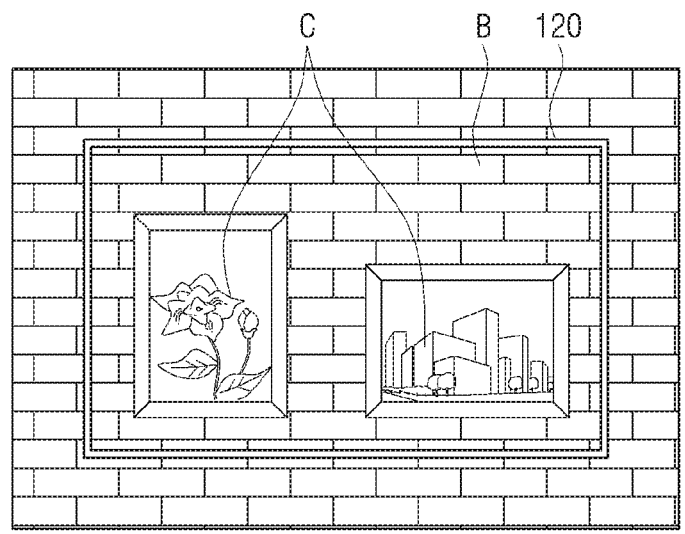
Figure 5C:
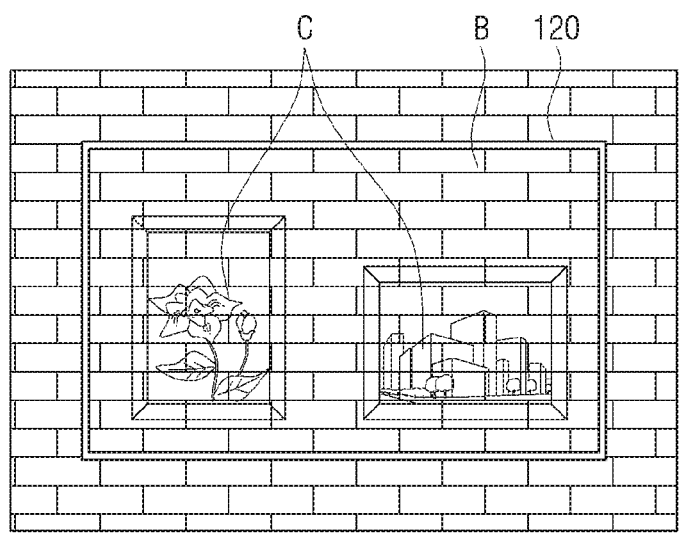

FIGS. 5A, 5B and 5C are diagrams illustrating an operation performed depending on content which requires a naturalness, in accordance with an example embodiment. For example, FIGS. 5A, 5B and 5C are diagrams illustrating an example of displaying the content which requires a naturalness when the content is displayed with the background of the display apparatus 100, such as a picture frame, etc.

FIG. 5A is a diagram illustrating the example in which the background image B and the content C before image-processing are displayed. In this case, since the image-processing of the content is not performed, a transparent effect is not generated. Thus, a user may not experience the transparent effect.

FIG. 5B is a diagram illustrating the example in which, after only the image-processing of the background image is performed, the image-processed background image and the content to which image-processing is not performed are displayed. In this case, since only the image-processing of the background image is performed, a transparent effect is generated. Thus, a user may experience the transparent effect. Further, since only the image-processing of the background image is performed, a high visibility of the content may be achieved.

In the case of the content for providing an aesthetic effect, however; if visibility increases, a user may feel tired when looking at the content. For example, in the case of the content such as, for example, a picture frame, a fish tank, a photo, etc., it is sometime advantageous to display the content so as to blend in with the surrounding so that the displayed content does not look awkward to a user.

Thus, in the case of the content for providing an aesthetic effect, the processor 140 may perform the image-processing of both the background image and the content as illustrated in FIG. 5C.

FIG. 5C is a diagram illustrating the example in which, after the image-processing of the background image and the image-processing of the content are performed, the image-processed background image and the image-processed content are displayed. In this case, since the image-processing of the background image is performed, a transparent effect may be generated. Thus, a user may experience the transparent effect. Also, as the image-processing of the content is performed, the content may look as if the content naturally blends in with the background of the display apparatus 100.

FIGS. 5A, 5B and 5C illustrate that whether to perform image-processing of content may be determined based on whether an aesthetic effect is to be provided, but the example embodiments are not limited thereto. For example, there may be a user who prefers a high visibility over an aesthetic effect, and in this case, the processor 140 may determine whether to perform image-processing of content in accordance with a setting set by the user.

Figure 6A:
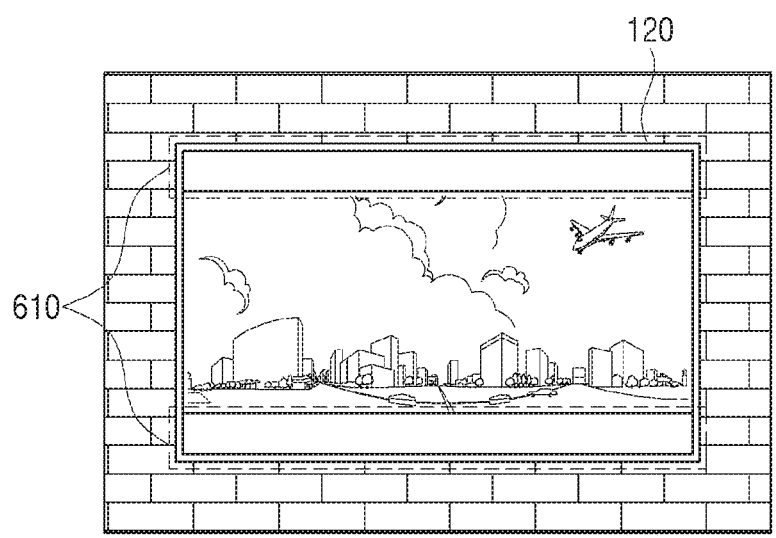
FIGS. 6A and 6B are diagrams illustrating an example in which a resolution rate of content is different from a resolution rate of a display, according to an example embodiment.
Figure 6B:
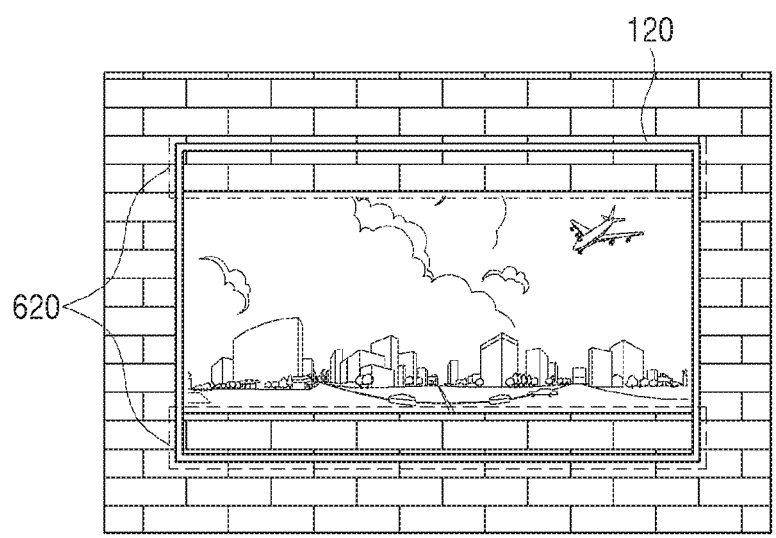

FIGS. 6A and 6B are diagrams illustrating the example in which a resolution rate of content and a resolution rate of a display are different from each other, in accordance with an example embodiment.

As illustrated in FIG. 6A, the processor 140 may magnify the content to correspond to the display 120 and display the magnified content. For example, the processor 140 may magnify the content to match a width of the display 120. If the resolution rate of the content is different from the resolution rate of the display 120, a blank area 610 may be created. The blank area 610 may be a the top of the display 120, at the bottom of the display 120, or both. In the related art, the blank area 610 is displayed as black, and accordingly, a transparent effect of the display apparatus 100 may be reduced. For example, in some cases the black area may be half of the display area of the display 120 such that the transparent effect is reduced by half.

As illustrated in FIG. 6B, if the resolution rate of the content is different from the resolution rate of the display 120, the background image may be displayed on an external area 620 of the area on which the content is displayed. The external area 620 may be a portion of the area on the display on which the content is displayed. For example, the background image may be displayed in the blank area 610. Also, high visibility of the content may be achieved by performing only image-processing of the background image.

In the descriptions of FIGS. 6A and 6B, it is described that the image-processing of the background image and the image-processing of the content may be performed for ease of description. Unlike in the example embodiment described above with respect to FIGS. 6A and 6B, the processor 140 may perform the image-processing of the background image and the image-processing of the content based on at least one of a type of content and sensing data. For example, the processor 140 may perform image-processing of the background image and the image-processing of the content based on a type of the content, based on the sensing data, or both.

Figure 7A:
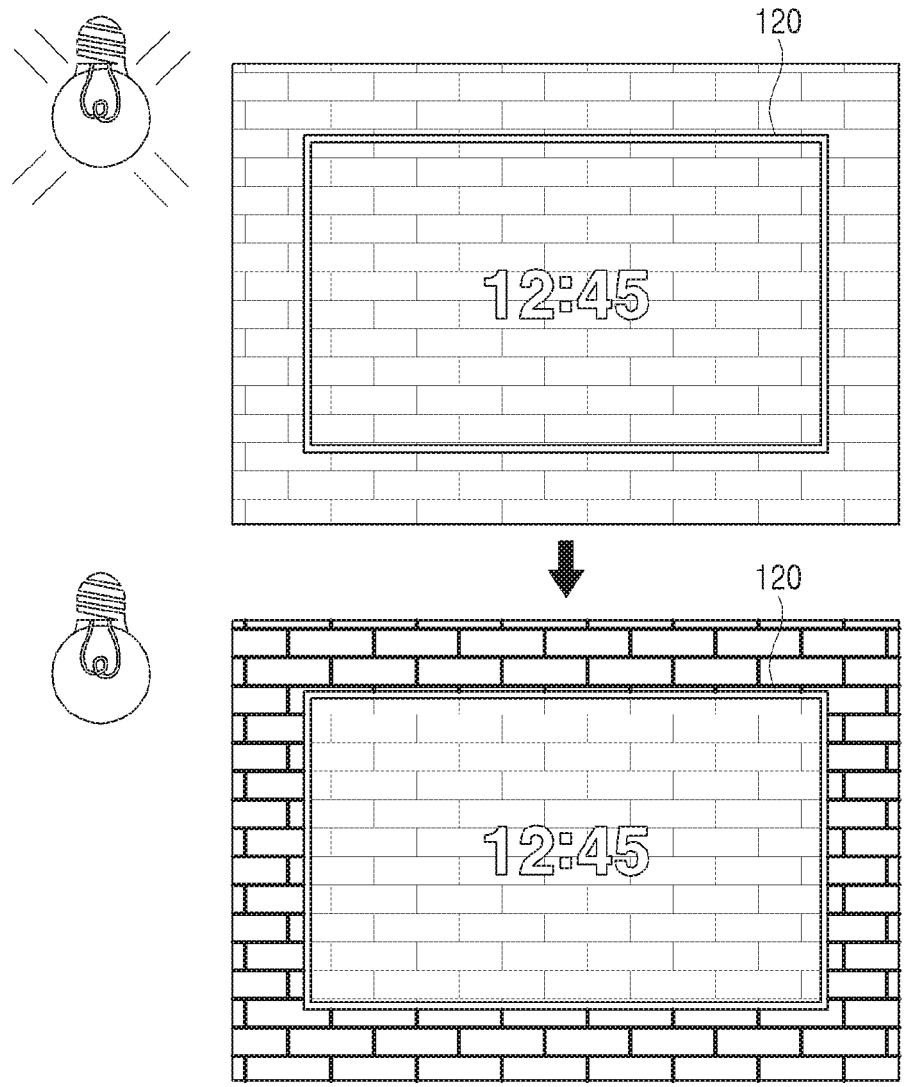
FIGS. 7A and 7B are diagrams illustrating a method for performing image-processing, according to an example embodiment.
Figure 7B:
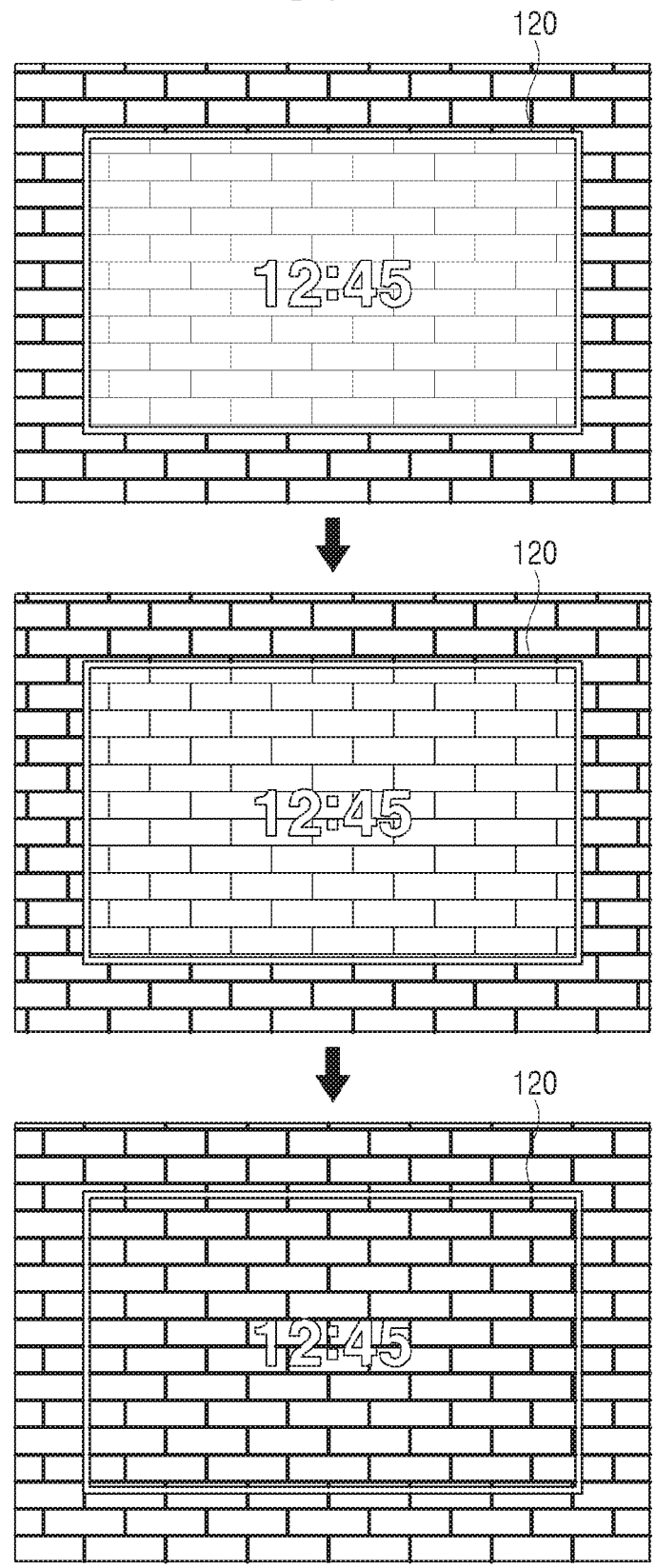

FIGS. 7A and 7B are diagrams illustrating a method for performing image-processing accordance with an example embodiment.

FIG. 7A illustrates the example in which only the image-processing of a background image is performed while a light is turned on. As illustrated in the second diagram in FIG. 7A, if a light is turned off, the processor 140 may perform the image-processing of the background image based on the sensing data of a light being turned off. Accordingly, the background image may be turned dark instantly in response to the manipulation of turning off the light as in the area behind the display apparatus 100 (i.e., in response to the decrease in ambient light). This may occur, for example, when the display apparatus 100 performs real-time processing of the content data and background data in response to the sensing data from the sensor 130.

On the other hand, as illustrated in FIG. 7B, in response to a light being turned off, the processor 140 may gradually change the image-processing in order to reduce the effects from the light being turned off. That is, the processor 140 may perform the image-processing for a period of time. For example, if at least one of a brightness and a color temperature is changed by a threshold value or more, the processor 140 may perform image-processing for a corresponding period of time.

For example, if a light is turned off and a brightness is changed by a threshold value or more due to the decrease in ambient light, the processor 140 may perform the image-processing of the background image for 30 seconds.

The processor 140 may determine the period of time based on the degree of change in brightness or color temperature. For example, the processor 140 may increase the period of time as the level of change in brightness increases.

The processor 140 may perform the image-processing of the background image at a time interval for the period of time. The time interval and the period of time may each be predetermined. In this way, a step-down effect may be produced in which the transparency of the content and background image are adjusted gradually in response to the decrease in ambient light. For example, the processor 140 may perform the image-processing of the background image at a three-second interval for 30 seconds. In this case, a user may see that the background image changes ten times at three-second time intervals over the 30 seconds. However, this interval and period of time are only an example, and different intervals and periods of time are contemplated.

The processor 140 may determine the time interval based on a period of time. For example, the longer the period of time is, the longer the interval the processor 140 may use.

It has been described in FIG. 7B that the image-processing of the background image may be performed through three stages for ease of description, but the example embodiments are not limited thereto.

Figure 8:
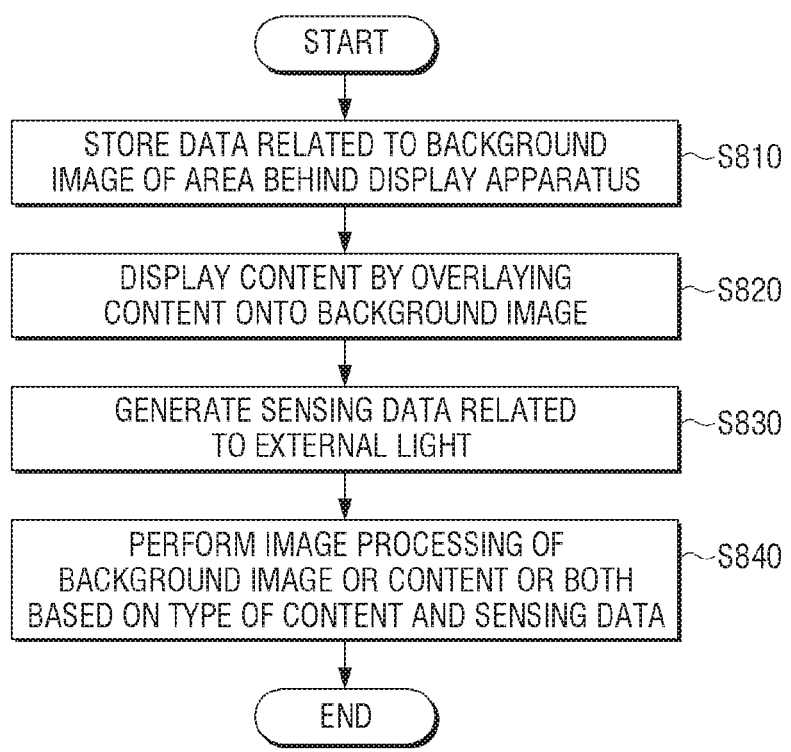
FIG. 8 is a flowchart illustrating a control method of a display apparatus, according to an example embodiment.

FIG. 8 is a flowchart illustrating a control method of a display apparatus in accordance with an example embodiment.

The data related to the background image of an area behind the display apparatus may be stored (S810), and the content may be displayed by overlaying the content onto the background image (S820). That is, for example, a camera 182 on the display apparatus 100 may be used to generate image data of an area behind the display apparatus 100 (e.g., such as the brick wall in FIGS. 4A-7B), and this data may be stored. The sensing data related to external light may be generated (S830). The sensing data related to external light may be generated in real time.

At least one of image-processing of the background image or the image-processing of the content may be performed based on a type of the content and the sensing data (S840). That is, image-processing of the background image may be performed, or image-processing of the content may be performed, or both may be performed.

In some example embodiments, in the operation of the image-processing (S840), the image-processing of the background image may be performed based on the sensing data, and the image-processing of the content may be determined based on a type of the content.

In some example embodiments, in the image-processing (S840), the image-processing of the background image may be performed based on the sensing data, and whether to perform the image-processing of the content may be determined based on a type of the content and the image-processed background image.

In some example embodiments, in the image-processing (S840), the image-processing of the background image may be performed based on the sensing data, the image-processing of the content may be performed based on a type of the content and the image-processed background image.

In the generating sensing data (S830), the sensing data may be generated by sensing at least one of a brightness and a color temperature of external (ambient) light, and in the image-processing (S840), at least one of a contrast of the background image or a contrast of the content may be changed based on the brightness, and at least one of a white balance of the background image or a white balance of the content may be changed based on the color temperature.

In the image-processing (S840), the image-processing may be performed for a period of time when at least one of the brightness or the color temperature is changed by a threshold value or more.

The display apparatus may include a graphic processor configured to perform graphic processing of input data and a video processor configured to recover data by decoding encoded data, and in the image-processing (S840), the background image and the content may be allocated to the graphic processor and the video processor and the image-processing of the background image and the image-processing of the content may be performed.

In the image-processing (S840), the content may be allocated to one of the graphic processor and the video processor based on a type of the content, and the background image may be allocated to the other one of the graphic processor and the video processor.

In the displaying (S820), if the resolution rate of the content is different from the resolution rate of the display, the background image may be displayed on an external area of the area on which the content is displayed.

According to one or more example embodiments, the display apparatus may perform image-processing of a background image or of content, or both, based on a type of content and external light, and accordingly, the transparent effect of a display may be maximized, and user convenience may improve.

Also, since the image-processing of the content and the image-processing of the background image are performed separately, different effects may be generated by the display apparatus 100 and provided to a user depending on a type of content.

The methods described in the various exemplary embodiments may be programmed and stored in various storage mediums. Accordingly, the methods described in the above-described example embodiments may be implemented in various types of electronic apparatuses which execute the program(s) stored in the storage media.

For example, a non-transitory computer-readable medium in which a program for performing the above-described control method may be provided.

A non-transitory computer readable medium may refer to a machine-readable medium or device which stores data semi-permanently and not for a short period of time, such as a register, cache, memory, and the like. The aforementioned various applications or programs may be stored in a non-transitory computer readable medium such as a compact disc (CD), a digital versatile disc (DVD), a hard disk, a Blu-ray disc, a universal serial bus (USB) stick, a memory card, a ROM, etc.

The foregoing example embodiments and advantages are merely examples and are not to be construed as limiting the example embodiments. The description of the example embodiments is intended to be illustrative, and not to limit the scope of the inventive concept, as defined by the appended claims, and many alternatives, modifications, and variations will be apparent to those skilled in the art.

What is claimed is:

1. A display apparatus comprising:
a memory;
a display;
a sensor; and
a processor configured to:
control the display to display content by overlaying the content onto a background image of an area behind the display apparatus stored in the memory;
receive sensing data related to external light around the display apparatus from the sensor;
determine whether to perform image-processing of the content based on a type of the content,
when it is determined to perform the image-processing of the content, perform image-processing of the background image and the content based on the sensing data, and
when it is determined not to perform the image-processing of the content, perform image-processing of the background image based on the sensing data.

2. The display apparatus of claim 1, wherein the processor is configured to perform the image-processing of the background image based on the sensing data, and determine whether to perform the image-processing of the content based on the image-processed background image and a type of the content.

3. The display apparatus of claim 1, wherein the processor is configured to perform the image-processing of the background image based on the sensing data, and perform the image-processing of the content based on the image-processed background image and a type of the content.

4. The display apparatus of claim 1, wherein the sensor is further configured to obtain the sensing data related to at least one of a brightness and a color temperature of the external light, and
wherein the processor is further configured to change a contrast of at least one of the background image and the content based on the brightness, and change a white balance of at least one of the background image and the content based on the color temperature.

5. The display apparatus of claim 4, wherein the processor is further configured to, if at least one of the brightness and the color temperature changes by at least a threshold value, perform the image-processing for a period of time.

6. The display apparatus of claim 1, further comprising:
a video processor configured to recover encoded data by decoding the data,
wherein the processor comprises a graphic processor configured to perform graphic-processing of input data, and
wherein the processor is further configured to allocate the background image and the content to the graphic processor and the video processor, and the graphic processor and the video processor are further configured to perform image-processing of the allocated background image and the allocated content.

7. The display apparatus of claim 6, wherein the processor is further configured to allocate the content to one of the graphic processor and the video processor based on the type of the content, and allocate the background image to the other one of the graphic processor and the video processor.

8. The display apparatus of claim 1, wherein the processor is further configured to, if a first resolution rate of the content is different from a second resolution rate of the display, control the display to display the background image on a portion of an area on which the content is displayed.

9. A control method of a display apparatus, the control method comprising:
displaying content by overlapping the content onto a background image of an area behind the display apparatus;
receiving sensing data related to external light that is around the display apparatus from a sensor included in the display apparatus; and
determining whether to perform image-processing of the content based on a type of the content;
when it is determined to perform the image-processing of the content, performing image-processing of the background image and the content based on the sensing data; and
when it is determined not to perform the image-processing of the content, perform image-processing of the background image based on the sensing data.

10. The control method of claim 9, wherein the performing image-processing comprises performing the image-processing of the background image based on the sensing data, and determining whether to perform the image-processing of the content based on the image-processed background image and a type of the content.

11. The control method of claim 9, wherein the performing image-processing comprises performing the image-processing of the background image based on the sensing data, and performing image-processing of the content based on the image-processed background image and a type of the content.

12. The control method of claim 9, wherein the obtaining sensing data comprises obtaining the sensing data related to at least one of a brightness and a color temperature of the external light, and
wherein the performing image-processing comprises changing a contrast of at least one of the background image and the content based on the brightness, and changing a white balance of at least one of the background image and the content based on the color temperature.

13. The control method of claim 12, wherein the performing image-processing comprises, if at least one of the brightness and the color temperature changes by at least a threshold value, performing the image-processing for a period of time.

14. The control method of claim 9, wherein the display apparatus comprises a graphic processor configured to perform graphic-processing of input data and a video processor configured to recover encoded data by decoding the data, and
wherein the performing image-processing comprises allocating the background image and the content to the graphic processor and the video processor, and performing, by the graphic processor and the video processor, image-processing of the allocated background image and the allocated content.

15. The control method of claim 14, wherein the performing image-processing comprises allocating the content to one of the graphic processor and the video processor based on the type of the content and allocating the background image to the other one of the graphic processor and the video processor.

16. The control method of claim 9, wherein the displaying content comprises if a first resolution rate of the content is different from a second resolution rate of the display, displaying the background image on a portion of an area on which the content is displayed.

17. A non-transitory recording medium in which a program for performing an operation method of a display apparatus is stored, the operation method comprising:
displaying content by overlapping the content onto a background image of an area behind the display apparatus;
receiving sensing data related to external light that is around the display apparatus from a sensor included in the display apparatus;
determining whether to perform image-processing of the content based on a type of the content; and
when it is determined to perform the image-processing of the content, performing image-processing of the background image and the content based on the sensing data; and
when it is determined not to perform the image-processing of the content, perform image-processing of the background image based on the sensing data.

* * * * *